Dec. 7, 1965 A. S. FARBER 3,222,549

MONOSTABLE LOGIC CIRCUIT

Filed Nov. 1, 1963

INVENTOR.
ARNOLD S. FARBER

BY

Edward G. Fiorito
ATTORNEY

United States Patent Office 3,222,549

Patented Dec. 7, 1965

3,222,549

MONOSTABLE LOGIC CIRCUIT

Arnold S. Farber, Yorktown Heights, N.Y., assignor to International Business Machines Corporation, New York, N.Y., a corporation of New York Filed Nov. 1, 1963, Ser. No. 320,794
16 Claims. (Cl. 307—88.5)

Figure 1:
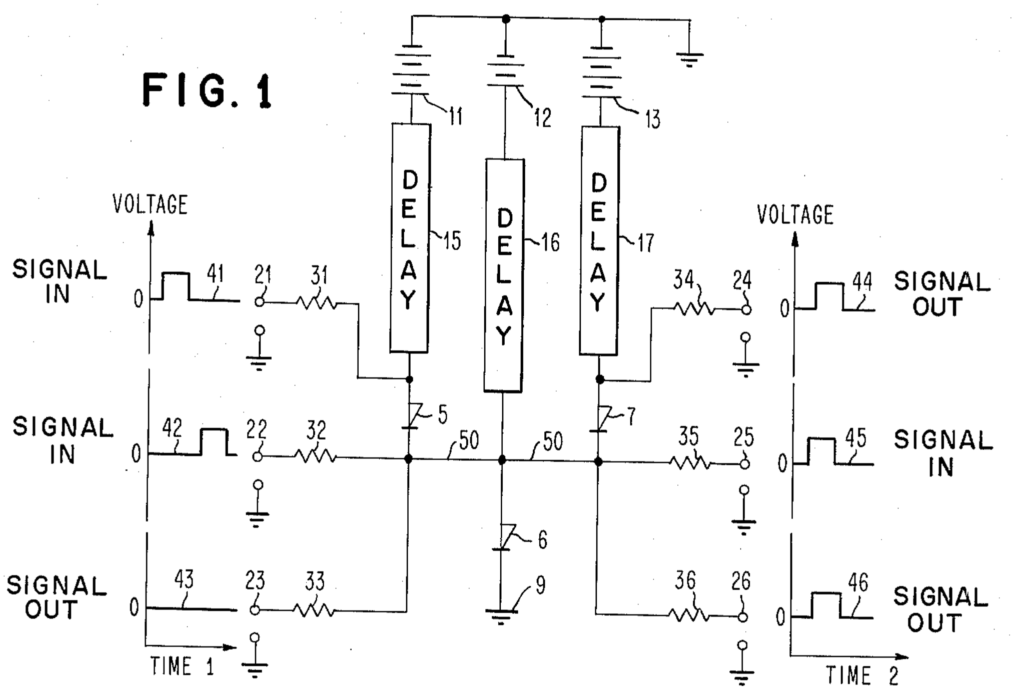

This invention relates to digital computer circuits, and more particularly to a monostable logic circuit employing tunnel diodes.

The fast switching speed of the tunnel diode is one of the attributes of this component which makes it desirable for use in logic circuits. However certain problems arise in designing logic circuits which employ two terminal components, such as tunnel diodes, as opposed to transistors and tubes which have three terminals.

One problem is attempting to isolate the input signals to the logic circuit from the output signals. Where three terminal components are employed a natural isolation exists between the inputs and outputs. For example the input signal may be applied across the base-emitter junction of a transistor, and the output may be derived from the voltage across the collector and emitter. Variations in the input signal which do not effect the conduction of the transistor do not appear in the output. Therefore the output is isolated from these input variations. However the tunnel diode does not exhibit this feature of isolation since it has only two terminals. Signals applied to one of the terminals are coupled through the tunnel diode to the other terminal. Therefore signal variations on the input terminal which are insufficient to cause the tunnel diode to switch may still appear on the output terminal unless some other provision for isolation is provided.

Another problem related to the above problem of isolation is that of maintaining directivity in the flow of data signals. The normal direction of data flow through a logical circuit is from the input to the output. Signals applied to the output of the circuit ordinarily should not be reflected at the input, since this backward direction of flow would create spurious signals in the computer system. The three terminal transistor component described above exhibits a natural resistance to the backward flow of data signals. That is signals applied across the collector and emitter do not create appreciable changes in voltage across the base-emitter junction. By contrast however, the tunnel diode is responsive to signals applied to either one of the two terminals. Further, when the tunnel diode switches, the voltage between the two terminals changes rapidly and is available at either one of the terminals. Therefore there is no natural directivity in the flow of data through the tunnel diode. Either terminal may respond to input signals and either terminal may provide output signals.

It is an object of the present invention to provide an improved tunnel diode logic circuit.

Another object of the present invention is to provide an improved tunnel diode logic circuit having isolation between inputs and outputs.

A further object of the present invention is to provide a tunnel diode logic circuit which exhibits a unidirectional flow of data signals.

Still another object of the present invention is to provide a tunnel diode logic circuit which exhibits both isolation between inputs and outputs, and a unidirectional flow of data signals.

It is another object of the present invention to provide an improved tunnel diode logic circuit which is capable of performing a variety of logical operations.

A further object of the present invention is to provide an improved tunnel diode logic circuit capable of performing the inhibit function.

Still another object of the present invention is to provide a tunnel diode logic circuit capable of performing the inhibit function and exhibiting isolation between input and output signals and also providing a unidirectional flow of data signals.

These and other objects of the present invention are accomplished in accordance with the broad aspects of the present invention by providing a pair of tunnel diodes connected in series and biased for monostable operation. Input terminals are provided so that one input signal is applied across one of the tunnel diodes and another input signal is applied across both of the series connected tunnel diodes. The tunnel diode connected to respond to both of the input signals is selected to have a peak current which is larger than the peak current of the other tunnel diode. In this manner input signals applied across both of the tunnel diodes cause the diode having the smaller peak current to switch. The output is derived from the voltage across the tunnel diode which has the larger peak current. Isolation is maintained between the output and the input applied across both of the diodes since only the diode having the lower peak current switches in response to this output.

In addition to the feature of isolation, the present invention performs the inhibit function. In operation the tunnel diode having the larger peak current is inhibited from switching for a period after the other tunnel diode switches to its high voltage state. The interval during which the inhibit operation takes place is determined by the characteristics of the monostable biasing arrangement.

In accordance with another aspect of the present invention a third tunnel diode is added at the junction between the series connected tunnel diodes described above. A second output signal is derived from the combined voltage appearing across the third tunnel diode and the tunnel diode having the larger peak current. By selecting the peak current of the third tunnel diode to be relatively small, directivity in the flow of data signals is achieved. In operation, spurious signals applied to the second output terminal cause only the third tunnel diode to switch. This does not effect the voltage across the first two tunnel diodes, and therefore prevents the backward flow of signals to the input terminals.

Another advantage of the present invention is that it provides isolation and directivity without sacrificing the fast switching speed of the tunnel diode.

Still another advantage of the present invention is the flexibility in performing various logical operations. Resistor input networks may be used to couple the inputs to the tunnel diodes. The values of the resistors may be varied to perform AND, OR, majority logic and other functions in combination with the inhibit function described above.

The foregoing and other objects, features and advantages of the invention will be apparent from the following more particular description of a preferred embodiment of the invention, as illustrated in the accompanying drawings.

Figures 2A, 2B, 2C:
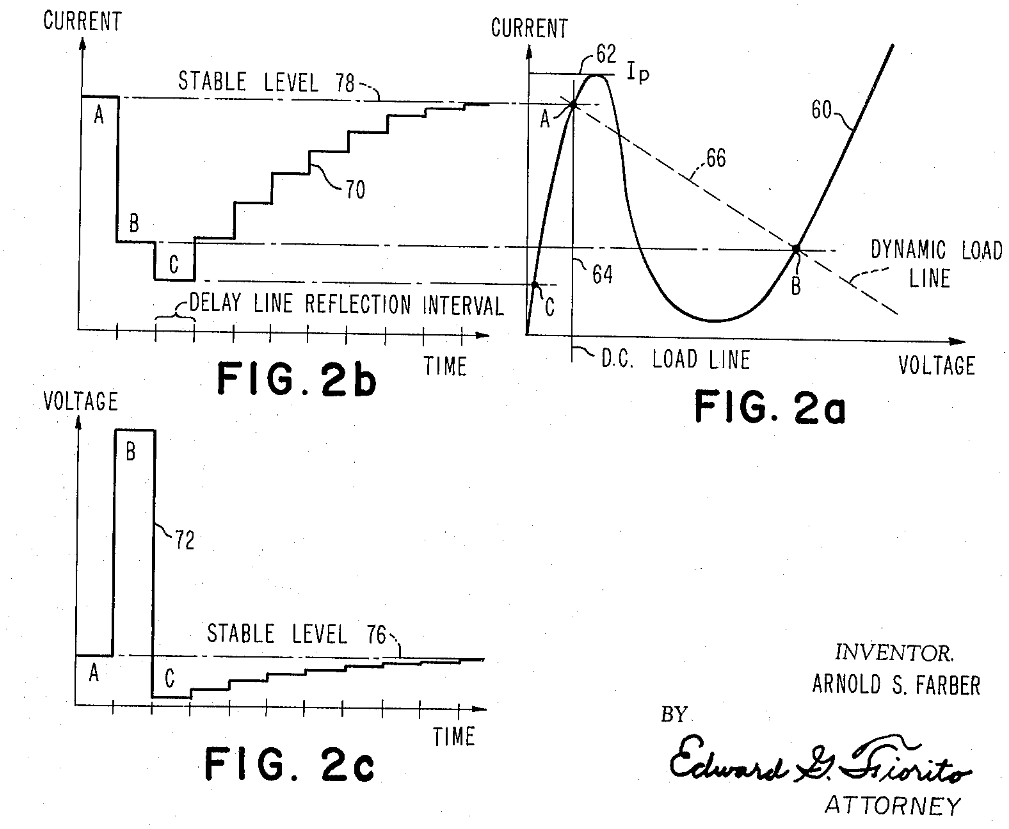

In the drawings:

FIG. 1 is a schematic illustrating a tunnel diode logic circuit embodying the present invention;

FIG. 2*a* is a graph illustrating the characteristics of the tunnel diodes employed in the circuit of FIG. 1;

FIGS. 2*b* and 2*c* are waveform diagrams illustrating the operation of the circuit of FIG. 1.

The general operation of the present invention may be described with reference to the circuit shown in FIG. 1. The three tunnel diodes 5, 6 and 7 are shown connected together so that their forward direction of current flow is toward the ground reference 9. The diodes 5–7 are biased by voltage sources 11–13 respectively. Delay lines 15–17 couple the sources 11–13 to the diodes 5–7 respectively.

The sources 11–13 are selected so that the diodes 5–7 are biased for monostable operation as will be described in more detail in connection with FIG. 2*a*. In operation the diodes 5–7 may be switched to a high voltage state for a certain interval of time after which they return to the low voltage state. The tunnel diodes 5–7 are switched by applying signals to the terminals 21–26, which are coupled by resistors 31–36 to the diodes 5–7 as shown in FIG. 1.

In order to illustrate the general operation of the circuit of FIG. 1 a set of waveforms 41–43 are shown adjacent to terminals 21–23. Another set of waveforms 44–46 are shown adjacent to terminals 24–26. It is to be noted that the waveforms 41–43 appear during an interval of time designated TIME 1 while the waveforms 44–46 appear at another time designated TIME 2. Therefore the operation of the circuit of FIG. 1 will first be described with reference to waveforms 41–43, and then the operation will be described with reference to waveforms 44–46. Each of the waveforms 41–46 varies with respect to the same ground reference 9 connected to tunnel diode 6. This is illustrated in FIG. 1 by the ground terminals placed adjacent to each of the input terminals 21–26. Therefore signals applied to terminal 21 are coupled by resistor 31 to tunnel diode 5, and are effectively applied across both tunnel diodes 5 and 6 with respect to ground 9. In a like manner signals applied to terminal 22 are coupled via resistor 32 to a junction line 50 between tunnel diodes 5 and 6. Therefore the signal on terminal 22 is effectively applied across tunnel diode 6 only. Signals applied to terminal 23 act in the same manner as those applied to terminal 22.

The first signal received by the circuit of FIG. 1 during TIME 1 is applied to the terminal 21. Both tunnel diodes 5 and 6 respond to this signal and begin conducting current in the forward direction. The current increases in each diode until the peak current is reached. The peak current of a tunnel diode is described below in connection with FIG. 2*a*. When one of the diodes 5 or 6 reaches the peak current value it switches from the low voltage state to the high voltage state. In accordance with the present invention the peak current of tunnel diode 5 is selected to be lower than the peak current of tunnel diode 6. Therefore tunnel diode 5 switches in response to signals applied to terminal 21 before tunnel diode 6 reaches its peak current value. Once tunnel diode 5 switches to the high voltage state the current passing therethrough decreases sharply inhibiting the flow of biasing current from source 11 to tunnel diode 6.

Tunnel diode 5 does not remain indefinitely in the high voltage state since the source 11 is selected so that this high voltage state is unstable. After an interval of time to be described in more detail in connection with FIG. 2*b*, the tunnel diode 5 returns to its low voltage state where it remains until other signals are applied to terminal 21. During the excursion of tunnel diode 5 from the low voltage state to the high voltage state it is to be noted that no signal variation appeared on terminal 22 or 23. This is illustrated by the 0 level maintained by waveforms 42 and 43 during the interval when the pulse appears in waveform 41. The terminals 22 and 23 reflect the signal appearing across tunnel diode 6. Since diode 6 remains in the low voltage state, no appreciable voltage variation is coupled back to the terminals 22 and 23.

An inhibit function is performed by the circuit when a second pulse is applied to terminal 22 after the first pulse applied to terminal 21 is terminated. The second pulse is coupled through resistor 32 and is applied across the tunnel diode 6. This pulse provides additional current through tunnel diode 6 approaching the peak current value. However due to the reduction in current supplied to tunnel diode 6 by source 11, the peak current of tunnel diode 6 is not reached. Therefore the tunnel diode 6 is prevented from switching in response to the pulse applied to the terminal 22. This operation is called the inhibit function since the early pulse applied to terminal 21 inhibits the effect of the later pulse applied to terminal 22.

Since diode 6 remains in its low voltage state, the pulse applied to terminal 22 creates substantially no signal variation on terminals 21 and 23. The effect of the pulse on terminal 22 is attenuated by the resistor 32 and the low impedance of tunnel diode 6. Since the low voltage state impedance of tunnel 6 is very small compared to the resistance value selected for resistor 32 and listed in Table 1 below, the voltage variation applied to terminal 22 creates only a small voltage variation on junction line 50 to which terminals 21 and 23 are coupled.

The signals appearing on terminals 24–26 during the application of waveforms 41 and 42 are not the waveforms shown in FIG. 1 but are effectively the same as the waveform 43 appearing at terminal 23. Since no substantial signal variation appears across tunnel diode 6 during the application of waveforms 41 and 42, no substantial signal variation is coupled to terminals 24–26.

The inhibit operation of the circuit of FIG. 1 is described above where the pulse on terminal 21 is applied prior to the pulse on terminal 22. In the next description of the operation of the circuit of FIG. 1, the first signal received by the circuit is applied across the tunnel diode 6. This signal is illustrated by waveform 45 applied to terminal 25 during the period designated TIME 2. The current supplied by the signal on terminal 25 in addition to the normal biasing current causes the tunnel diode 6 to exceed its peak current value and switch to the high voltage state. After a slight interval of time determined by the switching speed of the tunnel diode, the voltage level on the junction line 50 rises sharply. This increase in voltage is coupled through resistor 36 to terminal 26 where the pulse is provided as illustrated by waveform 46. The sharp rise in voltage across the tunnel diode 6 is also coupled through the tunnel diode 7 and resistor 34 to the terminal 24 as illustrated by the waveform 44.

The waveforms 44 and 46 are identical in shape since they are both derived from the voltage appearing across the tunnel diode 6. The signals appearing at terminals 21–23 are also identical with waveforms 44 and 46 since they are coupled in the same manner across tunnel diode 6.

The general operation of the logic circuit in FIG. 1 has been described. At this point the manner in which the tunnel diodes 5–7 are biased for monostable operation is described with respect to FIGS. 2*a*–2*c*. Many techniques could be used to bias the tunnel diodes 5–7 for monostable operation, see for example "Tunnel Diode Digital Circuitry," W. F. Chow, IRE Transactions on Electronic Computers, September 1960. The invention is not limited to the particular technique to be described. However, the illustrated method employing delay lines 15–17 has been found to be the preferred technique.

The graph shown in FIG. 2*a* represents the typical current-voltage characteristics of a tunnel diode. The curve 60 illustrates the two-state nature of the tunnel diode. The region beginning at the origin and continuing up to the peak current 62 is called the low voltage state of the tunnel diode. The region to the right of the valley of the curve 60 is called the high voltage state.

The voltage sources 11–13 are selected so that they result in a voltage across each of the diodes 5–7 lying within the low voltage regions of the tunnel diodes. Since there is no resistance in series with the tunnel diodes 5–7 and the sources 11–13, the D.C. load line may be illustrated by a vertical line 64 in FIG. 2*a*. For the D.C. condition there is only one point where the load line crosses the characteristic curve 60. Therefore there is only a single stable point of operation as illustrated by point A in FIG. 2*a*. However when a pulse is applied to the diodes 5–7, the A.C. impedance of the delay lines connected in series begins to effect the operation of the tunnel diode.

For example when a pulse is applied across tunnel diode 5 shown in FIG. 1 the A.C. impedance of the delay line 15 is effectively placed in series with the source 11 during the dynamic operation of the tunnel diode 5. The dynamic load line is illustrated in FIG. 2*a* by a broken line 66. The line 66 intersects the characteristic curve at points A and B. When the tunnel diode 5 switches to the high voltage state the dynamic operating level is illustrated by point B.

The detailed description of the monostable biasing operation is continued with respect to tunnel diode 5. However similar operations take place in diodes 6 and 7. FIG. 2*b* illustrates the current conducted by tunnel diode 5 at different stages in the operation. FIG. 2*c* illustrates the voltage across the tunnel diode 5 when it conducts the current values illustrated in FIG. 2*b*. When the tunnel diode 5 is operating in the low voltage state as illustrated by point A in FIG. 2*a* the amount of current conducted therethrough is shown by the portion of a waveform 70 adjacent to the letter A. The corresponding voltage across tunnel diode 5 is illustrated in FIG. 2*c* by the portion of a waveform 72 adjacent to the letter A. When the tunnel diode 5 switches to the dynamic operating point illustrated at B in FIG. 2*a* the current drops to the level B in FIG. 2*b*. In contrast however, the voltage rises sharply to the level at B in FIG. 2*c*. This rise in voltage from A to B sets up a traveling wave in delay line 15. The wave is a positive going step which is reflected at the end of delay line 15 into a negative going step. After an interval of time determined by the length of the delay line 15, the negative going step is applied to the tunnel diode 5. This reflected signal causes the tunnel diode 5 to switch back to the low voltage state and in fact drives the voltage across the tunnel diode to a point even lower than that represented by the point A in FIG. 2*a*. The operating level of tunnel diode 5, in response to the reflected wave, is illustrated by point C in FIG. 2*a*. As illustrated in FIG. 2*b* the current at C drops below the level at B. As illustrated in FIG. 2*c* the voltage drop from B to C exceeds the magnitude of the voltage rise from A to B.

When the diode 5 is operating at point C, the voltage is below the stable level illustrated by a broken line 76 in FIG. 2*c* drawn horizontal to the voltage level at time A. As illustrated in FIG. 2*b*, the current level at C is considerably below the stable level illustrated by a broken line 78 drawn horizontal to the current level at A.

The negative voltage step generated when tunnel diode 5 switches from the operating point B to the operating point C creates a negative traveling wave down the delay line 15. This negative wave is reflected at the end of the delay line and inverted into a positive wave. The positive wave increases the current value conducted by the tunnel diode 5 but is insufficient to drive the conduction level above the peak value 62 shown in FIG. 2*a*. The positive reflected wave, having added slightly to the current conducted by the tunnel diode 5, is reflected and inverted into a negative going wave which travels down the delay line 15 toward the voltage source 11 where it is inverted into a positive going wave. The positive going wave repeats the same performance as the previous wave, adding an increment of current to the value conducted by the tunnel diode 5. Other increments of current are added in a like manner causing the current conducted by tunnel diode 5 to approach the stable level 78 in an asymptotic manner as shown in FIG. 2*b*.

While the operation of the tunnel diode 5 has been described above, the operation of tunnel diodes 6 and 7 may also be described with reference to the FIGS. 2*a*–2*c*. However, in the case of tunnel diode 6, biasing current is supplied by all three of the sources 11–13. Therefore the sources 11–13 must be selected so that their combined effect does not produce a total current value through tunnel diode 6 which exceeds the peak current. Additionally the voltage sources 11–13 are selected so that when tunnel diodes 5 or 7 have switched from their low voltage state the tunnel diode 6 is prevented from switching in response to signals applied via terminals 22, 23, 25 or 26.

To illustrate the inhibit operation further, reference is made to the FIG. 2*b*. When tunnel diode 5 is conducting currents illustrated at B and C, the biasing current which reaches the tunnel diode 6 from source 11 is well below the characteristic stable level 78 of diode 6. Therefore input signals applied across tunnel diode 6 do not add sufficient biasing current to reach the peak current value of tunnel diode 6. However as the conduction of current through tunnel diode 5 begins approaching the stable level 78, a current level is reached which permits sufficient biasing current to flow through tunnel diode 5 to tunnel diode 6 so that the tunnel diode 6 may be switched by incoming signals. The time at which this occurs depends upon the rate at which the conduction through tunnel diode 5 approaches the stable level 78, which is determined by the length of the delay line.

In summary, a tunnel diode logic circuit has been shown which provides isolation between all terminals. A signal applied to any one of the terminals 21–26 has no effect upon the remaining terminals unless the input signal succeeds in switching the tunnel diode 6. Therefore each of the terminals 21–26 provides a signal which is solely dependent upon the operation of tunnel diode 6.

All of the terminals 21–26 are available for use as either input or output terminals according to the logical operation to be performed. In order to perform the inhibit function the overriding input should be applied to either terminal 21 or 24. For example, two input signals may be applied to terminals 21 and 22, while the output signal (or no output signal) may be derived from either or all of the terminals 23–26.

When unidirectional flow of data signals is desired, the output may be taken from either terminal 21 or 24. Therefore in the event that a signal is applied to the output terminal 21 or 24, only the tunnel diode 5 or 7 switches creating no appreciable change in voltage across the tunnel diode 6. In this manner the remaining terminals 22, 23, 25 and 26 produce no spurious signals due to the backward flow data signals.

The fast switching speed of the tunnel diode is preserved by the present invention. Inputs applied across tunnel diode 6 cause it to switch immediately providing an output signal on all of the terminals 21–26 with little delay.

The following table sets forth exemplary resistor values, voltage values and other characteristics of the components shown in FIG. 1, however, the invention is not limited to these values, nor any one of the values.

*Table I*

Delay lines 15 and 17—characteristic impedance 93 ohms, delay 1 nonasecond.
Delay line 16—characteristic impedance 50 ohms, delay 1 nonasecond.
Tunnel diodes 5 and 7—peak current 10 milliamps.
Tunnel diode 6—peak current 50 milliamps.
Resistors 31 to 36—51 ohms.
Voltage source 12—93 millivolts.
Voltage sources 11 and 13—131 millivolts.

Although the values for resistors 31–36 have been indicated in Table I to be equal, various logical functions can be performed by assigning different values to each of the resistors. For example, by increasing the value of resistors 32 and 33 it is possible to perform the AND logical function, requiring signals to be applied to both terminals 22 and 23 in order to provide sufficient biasing current to switch tunnel diode 6.

The logical OR function is performed in the specific embodiment described above. A signal on either of the terminals 2 2or 23 is sufficient to switch the tunnel diode 6, in the absence of inhibit pulses on terminal 21 or 24.

By assigning another set of values to resistors 32, 33, 35 and 36 the majority logic function can be performed. For example three out of the four terminals 22, 23, 25 and 26 may be required to receive simultaneous input signals in order to switch the tunnel diode 6.

The logical circuit of FIG. 1 may also be modified by eliminating the delay lines 15–16 and employing another means such as inductive components to provide monostable biasing for the tunnel diodes 5–7. In the embodiment shown in FIG. 1 the delay line 16 may be eliminated entirely where tolerance requirements permit. The delay line 16 merely performs the function of relaxing the close tolerance requirements placed upon the sources 11 and 13 which must combine to properly bias the tunnel diode 6. However effective operation of the circuit of FIG. 1 can be achieved using only delay lines 15 and 17.

Still another modification to the circuit of FIG. 1 can be made by adding additional tunnel diodes and associated biasing means to the junction line 50. The additional tunnel diodes would perform in the same manner as diodes 5 and 7 and add greater flexibility in the logical operation performed by the circuit.

Another apparent modification to the circuit of FIG. 1 may be made by reversing the forward direction of current flow of each of the tunnel diodes 5–7 along with the positive and negative terminals of the sources 11–13. In this case negative signals would be applied to the circuit and derived from the circuit.

While the invention has been particularly shown and described with reference to a preferred embodiment thereof, it will be understood by those skilled in the art that various changes in form and details may be made therein without departing from the spirit and scope of the invention.

What is claimed is:

1. A logic circuit comprising:
a first and a second tunnel diode connected in series and biased for monostable operation, said first diode having a larger peak current than said second diode; and
a pair of input means for applying one input signal across said first diode and another input signal across both of said diodes.

2. A logic circuit comprising:
a first and a second tunnel diode connected in series and biased for monostable operation, said first tunnel diode having a larger peak current than said second diode;
a pair of input means for applying one input signal across said first tunnel diode and second input signal across both of said diodes; and
output means for deriving an output signal across said first tunnel diode.

3. A logic circuit comprising:
a first and a second tunnel diode connected in series, said first tunnel diode having a larger peak current than said second tunnel diode;
biasing means for biasing said tunnel diodes for monostable operation, said biasing means including a delay line connected in series with each of said diodes; and
a pair of input means for applying a first signal across said first tunnel diode capable of switchinng said first diode and a second input signal across both of said diodes capable of switching said second diode.

4. Apparatus as defined in claim 3 further characterized by the addition of output means for deriving an output signal across said first tunnel diode.

5. A logic circuit comprising:
a first and a second tunnel diode connected in series, said first tunnel diode having a larger peak current than said second tunnel diode;
a pair of biasing means one connected in series with said first and second tunnel diodes and the other connected in series with said first tunnel diode for biasing said tunnel diodes for monostable operation; and
a pair of input means one for applying signals across said first and second tunnel diodes and the other for applying input signals across said first tunnel diode.

6. Apparatus as defined in claim 5 further characterized by the addition of output means for deriving an output signal across said first tunnel diode.

7. A logic circuit comprising:
a first and a second tunnel diode connected in series, said first tunnel diode having a larger peak current than said second tunnel diode;
a pair of biasing means one connected in series with said first and second tunnel diodes and other connected in series with said first diode for biasing said diodes for monostable operation, each of said biasing means including a delay line connected in series with a power supply; and
a pair of input means one for applying a signal across said first and second diodes and the other for applying an input signal across said first diode.

8. Apparatus as defined in claim 7 further characterized by the addition of output means for deriving an output signal across said first tunnel diode.

9. A logic circuit comprising:
a first and a second tunnel diode connected in series, said first tunnel diode having a larger peak current than said second tunnel diode;
a first voltage supply connected across said first and second diodes for biasing said diodes for monostable operation;
a second voltage supply connected across said first tunnel diode for supplying additional bias, said second voltage supply being of a lesser magnitude than said first voltage supply so that the combined biasing current from both of said supplies passing through said first tunnel diode is insufficient to reach the peak current of said first tunnel diode; and
a pair of input means for applying an input signal across said first tunnel diode and another input signal across said first and second tunnel diodes.

10. Apparatus as defined in claim 9 further characterized by the addition of an output means for deriving an output signal across said first tunnel diode.

11. A logic circuit comprising:
a first and a second tunnel diode joined together to form a series circuit, said first tunnel diode having a larger peak current than said second tunnel diode;
biasing means connected across said first and second diodes for biasing said diodes for monostable operation, said first biasing means including a delay line and a voltage source;
a second biasing means connected across said first tunnel diode for further biasing said first tunnel diode for monostable operation, said second biasing means including a delay line and a voltage source whose magnitude is smaller than the magnitude of the voltage source in said first biasing means so that the combined biasing current supplied by said first and second biasing means is insufficient to reach the peak current of said first tunnel diode; and
a pair of input means for applying one input signal across said first and second tunnel diodes capable of switching said second diode and another input signal across said first tunnel diode capable of switching said first diode.

12. Apparatus as defined in claim 11 further characterized by the addition of output means for deriving an output signal across said first tunnel diode.

13. A logic circuit comprising:
a first, second and third tunnel diode having one end of each joined together, said first tunnel diode having a larger peak current than the peak currents of said second and third tunnel diodes;

a pair of biasing means one connected across said first and second tunnel diodes and the other connected across said first and third tunnel diodes for biasing said tunnel diodes for monostable operation;

input means for applying one input signal across said first tunnel diode and another input signal across said first and second tunnel diodes; and output means for deriving an output signal across said first and third tunnel diodes.

14. A logic circuit comprising:

a first, second and third tunnel diode having one end of each joined together, said first tunnel diode having a larger peak current than said second and third tunnel diodes;

a pair of biasing means one connected across said first and second tunnel diodes and the other connected across said first and third tunnel diodes for biasing said diodes for monostable operation, said first biasing means including a voltage source coupled to said second tunnel diode through a delay line, said second biasing means including a voltage source coupled to said third tunnel diode through a delay line;

input means for applying one input across said first tunnel diode capable of switching said first diode, and another input across said first and second tunnel diodes capable of switching said second diode; and output means for deriving an output signal across said first and third tunnel diodes.

15. A logic circuit comprising:

a first, second and third tunnel diode having one end of each connected together so that the forward direction of current flow through said second and third tunnel diodes is consistent with the forward direction of current flow through said first tunnel diode, said first tunnel diode having a larger peak current than said second and third tunnel diodes;

a pair of biasing means one connected across said first and second tunnel diodes and another connected across said first and third tunnel diodes for biasing said diodes for monostable operation;

input means for applying an input signal across said first tunnel diode capable of switching said first diode, and another input signal across said first and second tunnel diodes capable of switching said second diode; and output means for deriving a signal across said first and third tunnel diodes.

16. Apparatus as defined in claim 15 further characterized by the addition of biasing means connected across said first tunnel diode for providing an additional biasing current to said first tunnel diode which, when combined with the biasing current supplied by said pair of biasing means is insufficient to reach the peak current of said first tunnel diode.

No references cited.

ARTHUR GAUSS, *Primary Examiner.*